United States Patent [19]

Chung et al.

[11] Patent Number: 6,123,822
[45] Date of Patent: Sep. 26, 2000

[54] CLEAR CATHODIC ELECTROCOATING COMPOSITIONS

[75] Inventors: Ding-Yu Chung, Rochester Hills; Yuehua Liu, Royal Oak, both of Mich.

[73] Assignee: E. I. du Pont de Nemours and Company, Wilmington, Del.

[21] Appl. No.: 09/208,208

[22] Filed: Dec. 9, 1998

[51] Int. Cl.$^7$ .................................................. C25D 13/10
[52] U.S. Cl. ........................ 204/489; 204/505; 204/506; 523/415
[58] Field of Search ..................... 204/489, 505, 204/506; 523/415

[56] References Cited

U.S. PATENT DOCUMENTS

| | | | |
|---|---|---|---|
| 3,922,253 | 11/1975 | Jerabek et al. | 260/77.5 TB |
| 4,137,140 | 1/1979 | Belanger | 204/181 C |
| 4,148,772 | 4/1979 | Marchetti et al. | 260/29.2 EP |
| 4,419,467 | 12/1983 | Wismer et al. | 523/414 |
| 4,468,307 | 8/1984 | Wismer et al. | 204/181 C |
| 5,070,149 | 12/1991 | DeBroy et al. | 525/296 |
| 5,176,804 | 1/1993 | Bittner et al. | 204/181.7 |
| 5,203,975 | 4/1993 | Richardson | 204/181.1 |
| 5,948,229 | 9/1999 | Zwack et al. | 204/506 |

*Primary Examiner*—Kishor Mayekar
*Attorney, Agent, or Firm*—Hilmar L. Fricke; Steven C. Benjamin

[57] ABSTRACT

An improved aqueous cathodic electrocoating composition having a binder of an epoxy-amine adduct which is an epoxy resin that has been reacted with an amine, a blocked polyisocyanate crosslinking agent and an organic or inorganic acid as the neutralizing agent for the epoxy amine adduct; where the improvement is a catalyst of an alkyl tin oxide that has been dissolved with an organic or inorganic acid to provide a clear cathodic electrocoating composition.

8 Claims, No Drawings

CLEAR CATHODIC ELECTROCOATING COMPOSITIONS

BACKGROUND OF THE INVENTION

This invention is directed to a cathodic electrocoating composition and in particular to a clear non-pigmented cathodic electrocoating composition.

The coating of electrically conductive substrates by an electrodeposition process, also called an electrocoating process, is a well known and important industrial process. Electrodeposition of primers to automotive substrates is widely used in the automotive industry. In this process, a conductive article, such as an autobody or an auto part, is immersed in a bath of a coating composition of an aqueous emulsion of film forming polymer and acts as an electrode in the electrodeposition process. An electric current is passed between the article and a counter-electrode in electrical contact with the aqueous emulsion, until a desired coating is deposited on the article. In a cathodic electrocoating process, the article to be coated is the cathode and the counter-electrode is the anode.

Resin compositions used in the bath of a typical cathodic electrodeposition process also are well known in the art. These resins typically are made from polyepoxide resins which have been chain extended and then an adduct is formed to include amine groups in the resin. Amine groups typically are introduced through reaction of the resin with an amine compound. These resins are blended with a crosslinking agent usually a blocked polyisocyanate and then neutralized with an acid to form a water emulsion which is usually referred to as a principal emulsion.

The principal emulsion is combined with pigment, coalescent solvents, water, and other additives to form the electrocoating bath. The electrocoating bath is placed in an insulated tank containing the anode. The article to be coated is the cathode and is passed through the tank containing the electrodeposition bath. The thickness of the coating that is deposited on the article being electrocoated is a function of the bath characteristics, the electrical operating characteristics, the immersion time, and the like.

The resulting coated article is removed from the bath after a set period of time and is rinsed with deionized water. The coating on the article is cured typically in an oven at sufficient temperature to produce a crosslinked finish on the article.

Cathodic electrocoating compositions, resin compositions, coating baths and cathodic electrodeposition processes are disclosed in Jarabek et al U.S. Pat. No. 3,922,253 issued Nov. 25, 1975; Wismer et al U.S. Pat. No. 4,419,467 issued Dec. 6, 1983; Belanger U.S. Pat. No. 4,137,140 issued Jan. 30, 1979 and Wismer et al U.S. Pat. No. 4,468,307 issued Aug. 25, 1984.

There currently is a demand for electrocoating compositions that are clear and non pigmented. Such compositions have greater stability in the electrocoating bath since there are no pigments that can settle out. Improved bath stability allows the bath to be operated under higher temperatures and cooling is either not needed or significantly less cooling is needed which reduces energy cost for cooling the bath. Electrocoating composition that do not contain pigments are much easier to manufacture since pigment dispersions are not required to be separately formed as is done with conventional pigment. Pigment dispersions are relatively difficult to manufacture and are expensive. By eliminating the use of pigment dispersion, results in substantial savings in time and materials. Also, coverage per unit of coating composition is increased due to the removal of high density pigments.

There is a problem with formulating such a clear coating composition. Alkyl tin oxide catalysts such as dibutyl tin oxide are used in the composition to catalyze the reaction between the polyepoxide resin and the blocked isocyanate crosslinking agent. This catalyst is a solid that is not water soluble and conventionally is dispersed in water often with pigments and then added to the electrocoating composition. Having the catalyst dispersed in the electrocoating composition would not provide a clear composition when it is electrodeposited and the catalyst can settle out of the electrocoating bath. Both are undesirable. It would be desirable to formulate a clear coating composition having a water soluble catalyst.

SUMMARY OF THE INVENTION

An improved aqueous cathodic electrocoating composition having a binder of an epoxy-amine adduct which is an epoxy resin that has been reacted with an amine, a blocked polyisocyanate crosslinking agent and an organic or inorganic acid as the neutralizing agent for the epoxy amine adduct; where the improvement is a catalyst of an alkyl tin oxide that has been dissolved with an organic or inorganic acid to provide a clear cathodic electrocoating composition.

DETAILED DESCRIPTION OF THE INVENTION

The clear electrocoating composition of this invention is an aqueous composition having a solids content of 5–50% by weight of a principal emulsion of a cathodic film forming resin and a blocked polyisocyanate crosslinking agent, additives, and the like and the composition usually contains organic coalescing solvents and has a pH of 5.5–8.0. The composition contains 0.01–5% by weight, based on the weight of the composition, of an alkyl tin oxide dissolved by an acid in aqueous composition as the catalyst for the reaction of the film forming resin with the isocyanate.

Typical alkyl tin oxides that are used are dibutyl tin oxide, dipropyl tin oxide, diethyl tin oxide and the like with dibutyl tin oxide being the preferred because of its catalytic activity. The alkyl tin oxide is dissolved in the aqueous electrocoating composition with an organic or inorganic acid to form a water soluble salt. Typically useful acids are lactic acid, acetic acid, formic acid, sulfamic acid, alkane sulfonic acids such as methane sulfonic acid, ethane sulfonic acid and propane sulfonic acid.

The novel composition is a clear non pigment containing electrocoating composition that has all the advantages associated with clear coating composition. Storage stability and stability in the electrocoating tank are substantially increased since there is no pigment present that will settle out. The composition is less costly since pigment dispersion are not used which are relatively expensive and time consuming to manufacture and the composition has higher coverage since the density is lower in comparison to pigmented compositions.

The cathodic film forming binder of the principal emulsion used to form the cathodic electrocoating composition is an epoxy amine adduct and a blocked polyisocyanate crosslinking agent and is dispersed in an aqueous medium. The epoxy amine adduct is formed of an epoxy resin which preferably is chain extended and then reacted with an amine. Typical aqueous cationic electrocoating compositions are shown in DebRoy et al U.S. Pat. No. 5,070,149 issued Dec. 3, 1991 and the aforementioned U.S. Pat. Nos. 3,922,253; 4,419,467; 4,137,140 and 4,468,307.

The epoxy resin used in the epoxy amine adduct is a poly epoxy hydroxy ether resin having an epoxy equivalent weight of 100–2000.

Epoxy equivalent weight is the weight of resin in grams which contains one gram equivalent of epoxy.

These epoxy resins can be any epoxy hydroxy containing polymer having a 1,2 epoxy equivalency of two or more epoxy groups per molecule. The preferred are polyglycidyl ethers of cyclic polyols. Particularly preferred are polyglycidyl ethers of polyhydric phenols such as bisphenol A. These polyepoxides can be produced by etherification of polyhydric phenols with epihalohydrin or dihalohydrin such as epichlorohydrin or dichlorohydrin in the presence of alkali. Examples of polyhydric phenols are 2,2-bis-(4-hydroxyphenyl)ethane, 2-methyl-1,1-bis-(4-hydroxyphenyl) propane, 2,2-bis-(4-hydroxy-3-tertiarybutylphenyl)propane, 1,1-bis-(4-hydroxyphenol)ethane, bis-(2-hydroxynaphthyl)methane and 1,5-dihydroxy-3-naphthalene.

Besides polyhydric phenols, other cyclic polyols can be used in preparing the polyglycidyl ethers of cyclic polyol derivatives. Examples of other cyclic polyols are alicyclic polyols, particularly cycloaliphatic polyols, such as 1,2-bis(hydroxymethyl)cyclohexane, 1,3-bis-(hydroxymethyl)cyclohexane, 1,2 cyclohexane diol, 1,4 cyclohexane diol and hydrogenated bisphenol A.

The polyepoxides hydroxy ether resins can be chain extended with any of the aforementioned polyhydric phenols, the preferred being bisphenol A, polyether or a polyester polyols which enhances flow and coalescence. Typical useful polyol chain extenders are polycaprolactone diols such as Tone 200® series available from Union Carbide Corporation, polyoxypropylene diamine such as Jeffamine D-2000® having a molecular weight of about 2000 available from Texaco Chemical Company and ethyoxylated Bisphenol A such as SYNFAC 8009® available from Milliken Chemical Company.

Examples of polyether polyols and conditions for chain extension are disclosed in U.S. Pat. No. 4,468,307. Examples of polyester polyols for chain extension are disclosed in Marchetti et al U.S. Pat. No. 4,148,772 issued Apr. 10, 1979.

Typical catalysts that are used in the formation of these polyepoxy hydroxy ether resins are tertiary amines such as dimethyl benzyl amine and organometallic complexes such as triphenyl phosphonium iodide.

Ketimines can be used in this invention with the epoxy amine adduct and are prepared from ketones and primary amines. The water formed is removed, for example, by azeotropic distillation. Useful ketones include dialkyl, diaryl and alkylaryl ketones having 3–13 carbons atoms. Specific examples include acetone, methyl ethyl ketone, methyl n-butyl ketone, methyl isobutyl ketone, methyl isoamyl ketone, methyl aryl ketone, ethyl isoamyl ketone, ethyl amyl ketone, acetophenone, and benzophenone. Suitable diamines are ethylene diamine, 1,3-diamopropane, 1,4-diaminobutane, 1,6-diaminohexane, 4,9-dioxadodecone and 1,12-diamine. One typically useful ketimine is diketimine which is the ketimine of diethylene triamine and methyl isobutyl ketone.

Typically useful primary and secondary amines used to form the epoxy amine adduct are diethyl amine, methyl ethyl amine, methyl ethanol amine, ethyl ethanol amine, mono ethanol amine, ethyl amine, dimethyl amine, diethyl amine, propyl amine, dipropyl amine, isopropyl amine, diisopropyl amine, butyl amine and dibutyl amine. Alkanol amines such as methyl ethanol amine are preferred.

The polyisocyanate crosslinking agents that are used are well known in the prior art. These are aliphatic, cycloaliphatic and aromatic isocyanates such as hexamethylene diisocyanate, cyclohexamethylene diisocyanate, toluene diisocyanate and methylene diphenyl diisocyanate. Methylene diphenyl diisocyanate is preferred. These isocyanates are pre-reacted with a blocking agent such as oximes, alcohols, or caprolactams which block the isocyanate functionality, i.e., the crosslinking functionality. Upon heating the blocking agents separate, thereby providing a reactive isocyanate group and crosslinking occurs. Isocyanate crosslinkers and blocking agents are well known in the prior art and also are disclosed in the aforementioned U.S. Pat. No. 4,419,467.

The binder of the electrocoating composition typically contains 20–80% by weight of the epoxy amine adduct and correspondingly 80–20% of the blocked isocyanate and are the principal resinous ingredients in the electrocoating composition.

The electrocoating composition of the invention can contain optional ingredients such as wetting agents, surfactants and defoamers. Examples of surfactants and wetting agents include alkyl imidazolines such as those available from Ciba-Geigy Industrial Chemicals as "Amine C", acetylenic alcohols available from Air Products and Chemicals as "Surfynol 104". These optional ingredients, when present, constitute from about 0.1 to 20 percent by weight of the binder of the composition.

Optionally, plasticizers can be used to promote flow. Examples of useful plasticizers are high boiling water immiscible materials such as ethylene or propylene oxide adducts of nonyl phenols or bisphenol A. Plasticizers are usually used at levels of 0.1 to 15 percent by weight of the binder of the composition.

The electrocoating composition of this invention contains 3 to 50 percent preferably 5 to 40 percent by weight binder solids. Aqueous binder concentrates which are to be further diluted with water when added to an electrocoating bath, generally have a range of binder solids of 10 to 30 percent weight.

The electrocoating composition of this invention is used in a conventional cathodic electrocoating process. The electrocoating tank contains two electrically conductive electrodes; the anode which is part of the electrocoating tank and the cathode which is the object that is to be coated such as an auto body or auto part. An adherent film is deposited on the cathode when a sufficient voltage is impressed between the two electrodes. The voltages that are applied may be varied depending on the type of coating and on coating thickness and throw power required and may be as low as 1 volt or as high as several thousand volts. Typical voltages used are between 50–500 volts. The current density usually is between 0.5 and 5 amperes per square foot and decreases during electrodeposition indicating that an insulating film is being deposited. A variety of substrates can be electrocoated with the composition of this invention such as steel, phosphatized steel, galvanized steel, copper, aluminum, magnesium and various plastics coated with an electrically conductive coating.

After the coating has been electrocoated, it is cured by baking at elevated temperatures such as 90–160° C. for 1–40 minutes.

The following example illustrates the invention. All parts and percentages are on a weight basis unless indicated otherwise.

EXAMPLE

The following constituents were prepared and then formulated into a clear cathodic electrocoating composition:

Dibutyl Tin Oxide Solution

59 Parts of dibutyl tin oxide are dissolved in a mixture of 94 parts of 70% aqueous methane sulfonic acid solution, 47 parts of a surfactant mixture (mixture of 120 parts of alkyl imidazoline, 120 parts of acetylenic alcohol and 120 parts butoxyethanol from Air Products and Chemical Inc.), 14 parts butanol and 30 parts deionized water. This solution was added to 4476 parts of deionized water.

Emulsion of Electrocoating Resin

The following ingredients were charged into a suitably equipped reaction vessel: 1046 parts of "Epon 828" (glycidyl ether of bisphenol A having an epoxy equivalent weight of 188 from Shell Chemical Company), 300 parts of bisphenol A, 376 parts ethoxylated bisphenol A having a hydroxyl equivalent weight of 248 ("SynFac 8009" from Milliken Company), 2 parts of dimethyl benzyl amine and 91 parts xylene. The resulting mixture was heated to 160C under a nitrogen blanket and held at this temperature for one hour. 3 parts dimethyl benzyl amine were added and the mixture was held at 147C until an epoxy equivalent weight of 1050 was obtained. 1503 parts of a blocked isocyanate crosslinker (diethylene glycol monobutyl ether and trimethylol propane with 87.5:12.5 equivalent ratio blocked "MONDUR" MR, a polymeric methylene diphenyl diisocyanate from Bayer at 75% solids) were added. 113 parts of diketimine (reaction product of diethylenetriamine and methyl isobutyl ketone at 72.7% solids) and 99 parts of methyl ethanol amine were added. The mixture was held at 120C for one hour. This resulting resin solution was added to the above prepare dibutyl tin oxide solution and emulsified. The resulting emulsion was stripped to remove organic solvents to give an emulsion having a 36% solids content.

Anticrater Additive

An anticrater additive was prepared by charging the following constituents into a suitable reaction vessel: 2322 parts of "Jeffamine D-2000" (polyoxypropylene diamine having an amine equivalent of 1000 from Huntsman Company), and 188 parts "Epon 828" (described above) were added under a nitrogen atmosphere and heated to 90C, followed by the addition of a solution of 859 parts by weight of "Epon 1001" (polyglycidyl ether of bisphenol A having an epoxy equivalent weight of 500 from Shell Chemical Company) in 345 parts by weight of 2 butoxyethanol. The resulting reaction mixture was dispersed by adding 68 parts acetic acid and 5354 parts deionized water. The resulting product had a solids content of 35%.

An electrocoating bath was prepared by blending together the following constituents:

|  | Parts by Weight |
| --- | --- |
| Emulsion of Electrocoating Resin | 3958.0 |
| Anticrater Additive | 214.0 |
| Deionized Water | 3414.0 |

Phosphatized steel panel were electrocoated in the bath at 35C and at 220 volts. The resulting electrodeposited film was 0.86 mils thick (21.8 microns) and was clear. After baking for 17 minutes at 182C the resulting film was crosslinked and withstood an excess of 100 double rubs with a methyl ethyl ketone soaked cloth which showed an excellent cure of the film. The film smoothness measured by a Profilometer was 13.

What is claimed is:

1. An improved aqueous cathodic electrocoating composition comprising a binder of an epoxy-amine adduct of an epoxy resin that has been reacted with an amine, a blocked polyisocyanate crosslinking agent and an organic or inorganic acid as the neutralizing agent for the epoxy amine adduct; wherein the improvement consists of a catalyst of an alkyl tin oxide dissolved with an organic or inorganic acid to provide a clear cathodic electrocoating composition.

2. The improved cathodic electrocoating composition of claim 1 in which the alkyl tin oxide is dibutyl tin oxide.

3. The improved cathodic electrocoating composition of claim 2 in which the acid is an inorganic acid selected from the group consisting of sulfamic acid, methane sulfonic acid, ethane sulfonic acid, and propane sulfonic acid.

4. The improved cathodic electrocoating composition of claim 2 in which the acid is an organic acid selected from the group consisting of lactic acid, acetic acid and formic acid.

5. The improved cathodic electrocoating composition of claim 2 in which the epoxy amine adduct comprises polyepoxy hydroxy ether resin extended with a dihydric phenol and reacted with an amine.

6. The improved electrocoating composition of claim 5 in which the blocked polyisocyanate crosslinking agent is blocked with a compound selected from the group consisting of diethylene glycol monobutyl ether, 2 methoxy propanol, butanol, methanol, ethanol or any mixtures thereof.

7. The improved electrocoating composition of claim 1 in which the alkyl tin oxide is dibutyl tin oxide, the acid is sulfonic acid and the epoxy amine adduct comprises polyepoxy hydroxy ether resin extended with a dihydric phenol and reacted with an amine.

8. A method of preparing a cathodic electrocoating composition comprising the following steps in any workable order:

(a) preparing an epoxy resin-amine adduct;

(b) preparing a blocked polyisocyanate crosslinking agent;

(c) blending the epoxy-amine adduct with the blocked polyisocyanate crosslinking agent;

(d) neutralizing the epoxy-amine adduct with an organic acid to form an emulsion;

(e) dissolving an alkyl tin oxide catalyst with an organic or inorganic acid and blending with the emulsion to provide a clear electrocoating composition.

* * * * *